United States Patent

Ivko

[15] 3,637,964
[45] Jan. 25, 1972

[54] MOTOR VEHICLE CONTROL PANEL
[72] Inventor: Joseph J. Ivko, 403 Las Olas Drive, Crown Point, Ind. 46307
[22] Filed: Dec. 1, 1969
[21] Appl. No.: 881,176

[52] U.S. Cl. ................................ 200/86.5, 340/62, 340/87
[51] Int. Cl. ................................................ H01h 3/14
[58] Field of Search .................. 340/62, 87; 200/16 R, 6 A, 200/86.5, 61.27, 5 R, 159 R

[56] References Cited

UNITED STATES PATENTS

| | | |
|---|---|---|
| 2,579,292 | 12/1951 | Brelsford ................................ 340/62 |
| 3,020,368 | 2/1962 | Nielsen .............................. 200/6 A X |
| 3,281,786 | 10/1966 | Leichsenring ....................... 340/62 X |
| 3,467,798 | 9/1969 | Krieger ................................ 200/86.5 |
| 3,506,795 | 4/1970 | Schmidt ............................... 200/16 X |
| 3,511,943 | 5/1970 | Kibler .............................. 200/61.27 X |

Primary Examiner—J. R. Scott
Attorney—Richard R. Mybeck

[57] ABSTRACT

A motor vehicle control panel is described which is foot operated. The panel contains a plurality of switching means mounted in strategically disposed relationship to each other to permit the selective operation of one of said switching means while preventing the inadvertant operation of another of said switching means. The switches are each connected to a different safety accessory of said vehicle to selectively control the operation thereof. The panel is especially useful to allow individuals having impairment or dismemberment of one or both arms to safely operate a motor vehicle.

9 Claims, 5 Drawing Figures

PATENTED JAN 25 1972  3,637,964
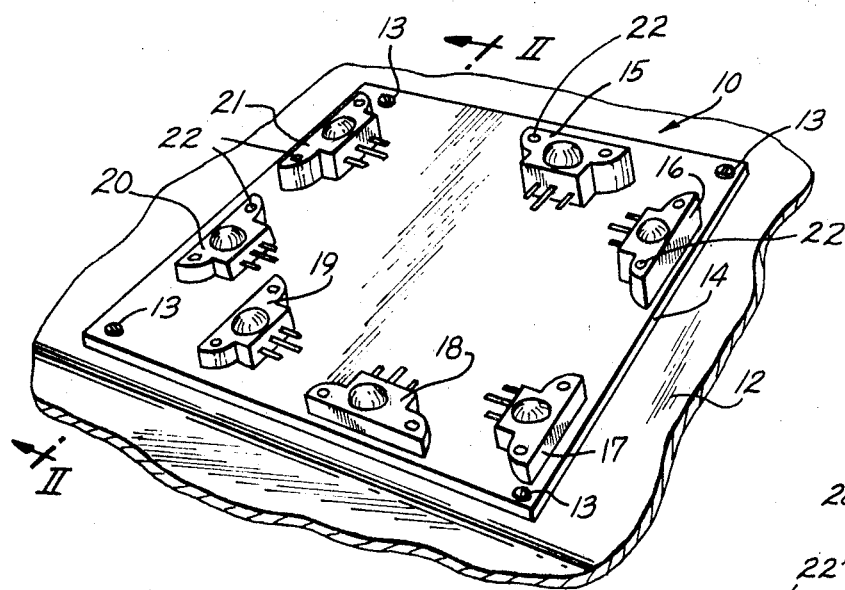
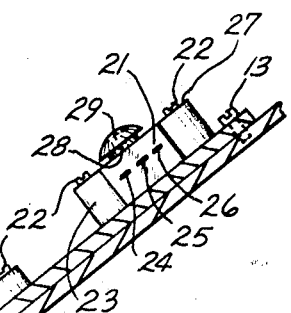
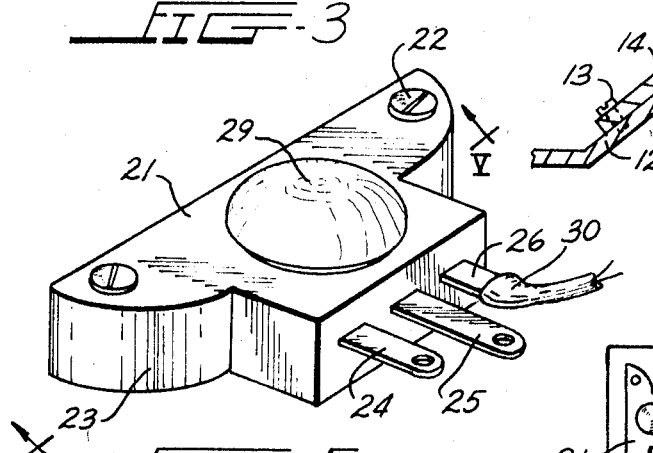
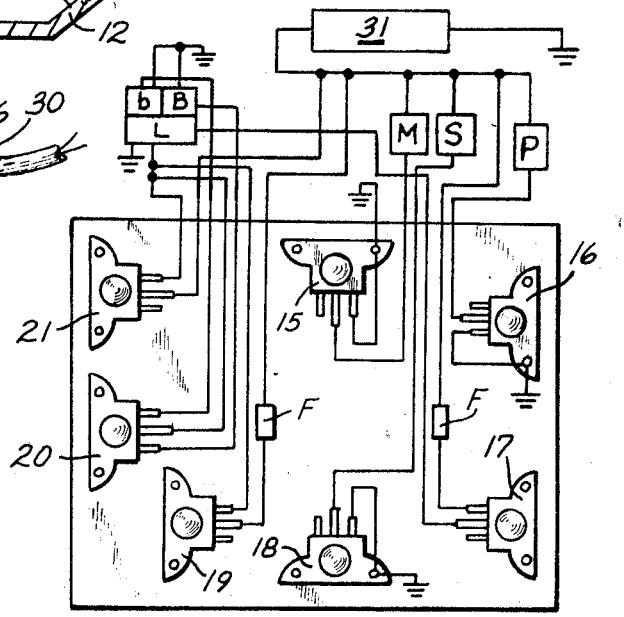
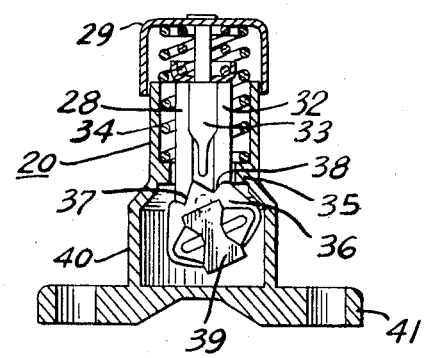
INVENTOR,
JOSEPH J. IVKO
BY Richard R Mybeck
ATTY.

MOTOR VEHICLE CONTROL PANEL

DESCRIPTION OF INVENTION

This invention relates generally to the operation and control of motor vehicle safety accessories, and more particularly to a motor vehicle control panel having a plurality of double-action switching means therein whereby headlights, windshield wipers, windshield washers, horns, left- and right-turn indicators and the like, are operated by the driver's foot and the driver may thus always keep his eyes on the road and his hands upon the steering wheel. My panel is especially useful to allow the upper extremity amputee having prosthetic arms to safely operate a motor vehicle with ease.

In the operation of motorized vehicles of various types, for which the automobile will be described as representative, a variety of switches are disposed on the steering column and dashboard to operate and control the various safety accessories. Without exception, all are positional for operation by a reach of the hand and are convenient for the ordinary driver. However, some drivers, out of habit or carelessness, will take their eyes off the road and view the switch they are about to operate and as such are not alert to what lies ahead of them on the road. This of itself is an unsafe practice which should be eliminated.

An even greater problem is posed by the conventional arrangement of the described accessory switches to the driver who has encountered amputation of portions of one or both arms and is either with or without prosthesis. For this person, even when fully prosthetic, operation of the controls for the horn and turn indicators is at best awkward and frequently necessitates foregoing all control of the steering wheel. Operation of pull, rotating or grip-type switches, such as are used to actuate headlights, windshield wipers and windshield washers, respectively, is essentially impossible for such persons. Thus, when such a driver is alone in his vehicle, he creates a substantial safety hazard to himself and to other motorists near him.

In some states, prospective drivers who have suffered amputation of their upper limbs are either denied or greatly restricted in their license to operate a motor vehicle. In still others, these handicapped drivers are considered high insurance risks and the premiums exacted of them to meet the minimum insurance coverage required by the State becomes an effective economic deterrent to their driving. Thus, these persons, at a time when psychologically they need their self-confidence restored, are rejected and rendered totally dependent on others for transportation.

Clearly a need exists for a control system which will allow the driver who has the ability to grip and safely manipulate the steering mechanism of a motor vehicle but who lacks the ability to quickly reach and grip the controls of his safety accessories, to somehow operate those accessories without having to quickly reach and grip such controls.

It is in response to that need that I, a bilateral upper arm amputee myself, set about to design and develop the control panel which I have herein described and illustrated. It should be noted, however, that while my device is especially useful to persons confronted with the physical restrictions attendant to upper limb prosthesis, that the device I have created is also useful to the physically complete driver for it enables him to drive with his hands on the steering wheel and his eyes on the road.

Therefore, it is an important object and advantage of the present invention to provide a device by means of which the lights, horn, windshield wipers, windshield washers and turn indicators of a motor vehicle may be operated by the use of the foot of the driver of the vehicle.

It is another object of the present invention to provide means for controlling the safety appliances in a motor vehicle which allows the driver to maintain complete control of his steering mechanism and keep his eyes on the road.

Still a further object of the present invention is to provide a control panel for installation into a motor vehicle which will enable a bilateral amputee having prosthesis to take and pass the driving tests administered by the various states.

A further object of the present invention is to provide a control panel for installation into a motor vehicle which allows a bilateral amputee with prosthesis to competently and safely operate a motor vehicle, even when alone, and thereby avoid a high risk penalty on his vehicle insurance.

Still another object of my present invention is to provide a control panel for motor vehicles which can be simply and easily operated by the left foot and does not require extensive training to use.

These and still further objects, as they hereinafter appear, are readily fulfilled by my present invention in an unobvious manner as will be discerned from a careful consideration of the following detailed description of exemplary embodiments thereof, especially when read in conjunction with the accompanying drawing in which:

FIG. 1 is an isometric view of a foot-operated vehicle signal control panel of the invention adapted to be mounted on the floor of a motor vehicle;

FIG. 2 is an enlarged side elevational view, partially in section, of the panel taken along line II—II of FIG. 1;

FIG. 3 is an enlarged isometric view of one switching means of the panel;

FIG. 4 is a circuit diagram of the entire control panel; and

FIG. 5 is a cross-sectional view, taken along line V—V of FIG. 3, of a switching means useful in the present invention.

Referring to the drawings, my motor vehicle control panel is indicated by the general reference 10. Panel 10 is shown as mounted upon the floorboard 12 in the driver's compartment of a motor vehicle. Panel 10 is secured to floorboard 12 by any suitable fastener such as screws 13. The panel may be attached either upon or beneath the floorboard covering and preferably is located to the left of the brake pedal. This is an especially convenient location in vehicles having automatic transmission because there is no clutch pedal to obstruct such placement. When panel 10 is mounted beneath the floorboard covering, it will be appropriate to provide suitable openings in the covering to allow my switches to extend therethrough for reasons which will be hereinafter apparent.

When panel 10, which comprises a baseplate 14 and is suitably attached to vehicle floorboard 12 as by the passage of bolts 13 therethrough, baseplate 14 carries and supports a plurality of switch means 15, 16, 17, 18, 19, 20 and 21, each of which is secured to plate 14 by suitable fasteners such as bolts or machine screws 22.

The spaced relationship of the several switching means 15–21, inclusive, relative to each other is important and shall now be described.

Switches 17, 18 and 19 are located adjacent to the proximal (nearest the driver) portion of panel 10 to provide easiest access because, as will later appear, they are operatively connected to those accessories most frequently requiring use, that is, the turn indicators and the horn.

Switches 15, 16 and 21 are located adjacent the distal (farthest from the driver's bench) portion of panel 10 because, as will later appear, they are operatively connected to accessories which are used less frequently and even when used, do not require frequent operation, that is, the windshield wiper, the windshield washer and the headlight power switch.

Switching means 20, on the other hand, is located at the left median portion of panel 10 because when it is needed, it is used frequently, that is, it is connected into the dim-bright circuit of the headlamps.

As best shown in FIGS. 2, 3 and 5, a preferred switching means for this invention is illustrated as switching means 21 and comprises a housing 23 having a first connector 24, a second connector 25, and a third connector 26 extending outwardly therefrom to establish electrical connection therewith in a manner to be described. Mounted in housing 23 and extending through upper surface 27, is a retractable shaft member 28 which supports a pedal 29 on the upper end thereof. Shaft member 28 is responsive to pressure placed thereupon to open or close the electrical connection within the switching means. A biasing means is associated with shaft member 28 to retract the shaft to its starting position after its switching action is accomplished. These so-called "off-on," or two-position pushbutton switches, are well-known to the art and a description of further structural details of the switch itself is believed unnecessary in view of the familiarity of the art therewith.

Nonetheless, looking to FIG. 5, a typical switching means 20 is illustrated and comprises a shaft or tubular housing 28 upon which pedal 29 is mounted and telescopically moveable therewith in response to pressure applied thereto. Depending from pedal 29 is a pin and body portion 32 and pusher means 33, both circumscribed by spring means 34 which coacts with detent 35 and pedal 29 to reciprocate pedal 29 when pressure is released therefrom.

The downward movement of pedal 29 and hence pusher means 33 causes the lower tip of the pusher to engage the rocker member 36, either in the upper left-hand notch 37 or the upper right-hand notch 38 and rotate contact plate 39 from its first to its second position and vice versa in sequence. Shaft 28 is carried by and may be formed integrally with lower housing 40 mounted to bottom plate 41 which is secured in the assembly by the insertion of bolts 22 through the openings defined therein as is herein described.

As shown in FIG. 4, an especially convenient arrangement is obtained when switching means 15 is wired to control the electrical motor "M" of the windshield wiper and switch 16 is wired to control the electrical pump "P" of the windshield washers. In both of these switches, center connector, illustrated as 25 relative to FIG. 3, is connected to power source, that is, battery 31, so that is the hotline of the circuitry. One of the side connectors (e.g., 24) is left unconnected and the other (e.g., 26) is connected to ground. Thus, when pedal 29 is depressed and released to move the switching contact to join the hotline with the ground, the accessory connected in the line therewith will be activated. When pedal 29 is depressed and released for a second time, the switching contact will move to join the hotline and the dead line and the appliance will be deactivated.

Switching means 17, 18, 19 and 21 are similarly wired to provide on-off control of my right turn indicator signal, my horn, my left turn signal indicator and my headlights, respectively. The ground line for each of the turn signals is wired into my front and rear lights to provide the appropriate warning signal in the usual fashion.

The action of each of the switches, in response to the successive depressions and release of its shaft members 28, is to move the contact from a first position, in which the hotline is in circuit with the dead line, to a second position, in which the hotline is in circuit with the ground through the accessory.

The center connector of the sixth switching means, that is, switching means 20, is connected to the hotline of power source but through the headlamp circuit while one of the side connectors (e.g., 24) is connected to ground through the low beam of the headlights and the other (e.g., 26) is connected to ground through the high beam of the headlights. In this manner, switch 20 is effective to move between the high-beam and low-beam circuit but is energized only when the headlamps are connected with the hotline.

The foregoing are schematically illustrated in the wiring diagram of FIG. 4 wherein the power source is represented by battery 31 and the various accessories connected in series with the switches are shown by boxes which have been coded as explained below. A schematic box is also used to illustrate the headlamps which, as is known, are grounded to the vehicle frame.

The various symbols used in FIG. 4 are: "M"—the windshield wiper motor; "P"—the windshield washer pump; "L"—the front and rear lighting circuits; "F"—the turn indicator flashers; "S"—the horn signal; "B"—the high-beam circuit for headlights; and "b"—the low-beam circuit of the headlamps.

When panel 10 is mounted to floorboard 12 in the manner described as illustrative and when the circuits of the several switching means 15–21, inclusive, are wired as described, a highly useful control system is created whereby all necessary motor vehicle safety accessories can be operated solely by foot action. Thus, with my system, drivers who have encountered hand or arm amputations are still able to drive safely and can avoid the burden of high risk insurance premiums.

In operation, each of the vertically moving pushbutton switches 15–21, inclusive, are operated selectively as desired, by engaging pedal portion 29 with the left foot of the vehicle driver and pressing it downwardly with reference to the plane defined by the baseplate 14. This movement actuates the pushbutton switch 15 to close the appropriate electrical circuit and activate or deactivate the desired accessory. Inasmuch as shaft 28 is automatically returned to its uppermost position upon release of foot pressure, the circuit action is changed simply by again depressing the shank and moving the switch to its other position.

From the foregoing, it becomes apparent that a new and highly useful motor vehicle control panel has been herein described and illustrated which fulfills all of the aforestated objectives in a remarkably unexpected fashion and allows the upper extremity amputee to operate a motor vehicle with efficiency and safety. It is, of course, understood that the embodiments herein described and illustrated are presented to exemplify the invention but that other modifications, adaptations and alterations, as may occur to the artisan when confronted with this disclosure, are intended within the spirit of this invention, especially as it is defined by the scope of the claims appended hereto.

What is claimed is:

1. A motor vehicle control panel for foot operation comprising: a baseplate mounted upon the floorboard of a motor vehicle, and a plurality of switching means mounted upon said baseplate in strategically spaced relationship to each other to permit the selective foot operation of one of said switching means while simultaneously preventing the inadvertent operation of another of said switching means, each of said switching means having an electrical connector therewithin being actuatable from a first position to a second position in response to a first force applied to said means, said connector being actuatable between from said second position to said first position in response to a second force applied thereto, each of said switching means being associated in electrical connection with a different motor vehicle safety accessory and operative to selectively control the operation thereof.

2. A motor vehicle control panel according to claim 1 in which one of said switching means completes a circuit containing a horn signal when in said first position and breaks said circuit when in said second position.

3. A motor vehicle control panel according to claim 1 in which one of said switching means completes a circuit containing a turn signal indicator when in said first position and breaks said circuit when in said second position.

4. A motor vehicle control panel according to claim 1 in which one of said switching means completes a circuit containing a window washer pump when in said first position and breaks said circuit when in said second position.

5. A motor vehicle control panel according to claim 1 in which one of said switching means completes a circuit containing vehicle headlamps when in said first position and breaks said circuit when in said second position.

6. A motor vehicle control panel according to claim 1 in which one of said switching means completes a circuit containing a windshield wiper motor when in said first position and breaks said circuit when in said second position.

7. A motor vehicle control panel according to claim 1 in which each of said switching means comprises a housing, a shank member extending axially in said housing, and moveable from a first position to a second position in response to a force applied thereto and returnable to said first position upon removal of said force therefrom, said shank member being operable to move said connector when in said second position.

8. A motor vehicle control panel according to claim 1 in which said switching means which are operatively connected to the left and right turn indicators and the horn are disposed adjacent the proximal edge of said baseplate.

9. A motor vehicle control panel according to claim 8 in which said switching means which are operatively connected to the windshield wiper motor, the windshield washer pump, and the headlamps are disposed adjacent the distal edge of said baseplate.

* * * * *